(12) United States Patent
Kaplow et al.

(10) Patent No.: US 8,909,564 B1
(45) Date of Patent: Dec. 9, 2014

(54) PREDICTIVE MODEL EVALUATION AND TRAINING BASED ON UTILITY

(75) Inventors: Robert Kaplow, New York, NY (US); Wei-Hao Lin, New York, NY (US); Gideon S. Mann, New York, NY (US); Travis H. K. Green, New York, NY (US); Gang Fu, Kearny, NJ (US); Robbie A. Haertel, Sandy, UT (US)

(73) Assignee: Google Inc., Mountain View, CA (US)

( * ) Notice: Subject to any disclaimer, the term of this patent is extended or adjusted under 35 U.S.C. 154(b) by 421 days.

(21) Appl. No.: 13/224,245

(22) Filed: Sep. 1, 2011

Related U.S. Application Data

(60) Provisional application No. 61/499,629, filed on Jun. 21, 2011.

(51) Int. Cl.
*G06F 15/18* (2006.01)
*G06F 19/24* (2011.01)

(52) U.S. Cl.
USPC .............................................. 706/12; 706/21

(58) Field of Classification Search
USPC .......................................................... 706/12
See application file for complete search history.

(56) References Cited

U.S. PATENT DOCUMENTS

| | | | |
|---|---|---|---|
| 7,349,919 B2 | 3/2008 | Russell et al. |
| 8,209,271 B1 | 6/2012 | Lin et al. |
| 8,209,274 B1 | 6/2012 | Lin et al. |
| 8,229,864 B1 | 7/2012 | Lin et al. |
| 2003/0212851 A1 | 11/2003 | Drescher et al. |
| 2005/0234753 A1 | 10/2005 | Pinto et al. |
| 2009/0106178 A1 | 4/2009 | Chu |

OTHER PUBLICATIONS

Mangiameli et al., Model selection for medical diagnosis decision support systems, Decision Support Systems 36 p. 247-259 [online], 2004 [retrieved on Nov. 10, 2013]. Retrieved from the Internet: <URL:http://person.hst.aau.dk/04gr691/diverse/model_selection_decisionsupport.pdf>.*

Creative Commons Attribution-Share Alike 3.0 Unported, Cross-validation (statistics)., http://creativecommons.org., pp. 1-5.

Google Code labs, Developer's Guide—Google Prediction., Jun. 7, 2011, pp. 1-8.

Creative Commons Attribution-Share Alike 3.0 Unported, Winnow (algorithm)., http://creativecommons.org., pp. 1-2.

Duchi, John, et al., "Boosting with Structural Sparsity", 2009, cs.berkeley.edu [online]. [Retrieved on Jan. 25, 2011]. Retrieved from the Internet: <URL:http://www.cs.berkeley.edu/~jduchi/projects/DuchiSi09d.pdf>, 41 pages.

Duchi, John, et al., "Boosting with Structural Sparsity", Proceedings of the 26th International Conference on Machine Learning, Montreal, Canada, 2009, cs.berkeley.edu [online]. [Retrieved on Jan. 25, 2011]. Retrieved from the Internet: <URL:http://www.cs.berkeley.edu/~jduchi/projects/DuchiSi09a.pdf>, 8 pages.

(Continued)

*Primary Examiner* — Jeffrey A Gaffin
*Assistant Examiner* — Nathan Brown, Jr.
(74) *Attorney, Agent, or Firm* — Fish & Richardson P.C.

(57) ABSTRACT

Methods, systems, and apparatus, including computer programs encoded on a computer storage medium, for training a plurality of different types of predictive models using training data, wherein each of the predictive models implements a different machine learning technique. One or more weights are obtained wherein each weight is associated with an answer category in the plurality of examples. A weighted accuracy is calculated for each of the predictive models using the one or more weights.

30 Claims, 4 Drawing Sheets

(56) References Cited

OTHER PUBLICATIONS

R-Project web pages, 190 pages [online]. [Retrieved on May 18, 2010]. Retrieved from the Internet: <URL: http://www.r-project.org/>, 190 pages.

Uclassify web pages, [online]. [Retrieved on May 18, 2010]. Retrieved from the Internet: <URL:http://www.uclassify.com/>, 16 pages.

Zementis web pages [online]. [Retrieved on May 18, 2010]. Retrieved from the Internet: <URL:http://www.zementis.com/>, 34 pages.

Weiss, Integrating Real-Time Predictive Analytics into SAP Applications [online], Dec. 30, 2009 [retrieved on Sep. 29, 2011], Retrieved from the Internet: ,URL:http://www.sdn.sap.com/irj/scn/go/portal/prtroot/docs/library/uuid/a07faefd-61d7-2c10-bba6-89ac5ffc302c?QuickLink=index&overridelayout=true>, 1 page.

Hutter, et al., "Performance Prediction and Automated Tuning of Randomized and Parametric Algorithms,", Principles and Practice of Constraint Programing, Lecture Notes in Computer Science, 2006, 15 pages.

SAS Rapid Predictive Modeler, Overview, 2010, 4 pages.

Postema, et al., "A Decision Support Tool for Tuning Parameters in a Machine Learning Algorithm", Nanyang Techonological University, 1997, 9 pages.

"Active learning (machine learning)," Wikipedia, the free encyclopedia, [online] [retrieved on Sep. 8, 2011]. Retrieved from the Internet: http://en.wikipedia.org/wiki/Active learning (machine learning), 3 pages.

* cited by examiner

PREDICTIVE MODEL EVALUATION AND TRAINING BASED ON UTILITY

CROSS-REFERENCE TO RELATED APPLICATIONS

Under 35 U.S.C. §119, this application claims benefit of U.S. Provisional Application Ser. No. 61/499,629, filed Jun. 21, 2011, the entire contents of which are hereby incorporated by reference.

BACKGROUND

This specification generally relates to training and evaluating predictive models.

Predictive modeling generally refers to techniques for extracting information from data to build a predictive model (or "model") that can predict an output from a given input. Predicting an output can include predicting future trends or behavior patterns, or performing sentiment analysis, to name a few examples. Various types of predictive models can be used to analyze data and generate predictive outputs. Examples of predictive models include Naive Bayes classifiers, k-nearest neighbor classifiers, support vector machines, and logistic regression techniques, for example. Typically, a predictive model is trained with training data that includes input data and the desired predictive output. The amount of training data that may be required to train a predictive model can be large, e.g., in the order of gigabytes or terabytes. The number of different types of predictive models available is extensive, and different models behave differently depending on the type of input data.

SUMMARY

The value of making a decision given the prediction of an algorithm can depend on the true outcome and the decision to be made. For instance, the value of accepting a loan application when the loan will be paid back in full is roughly the amount of interest the loan will bring in; the cost of accepting a loan that will not be paid back is the amount of money not paid back; the (opportunity) cost of rejecting a loan that will be paid back is the amount of the loan. When predictive models are evaluated based solely on their accuracy, this "utility" is lost. In various implementations, a predictive model can be evaluated and trained with an eye towards maximizing the utility of the model. Weights or functions can applied to predictive model outputs for different types of model input in order to determine which models perform best. A utility function can be used to guide the training of models.

In general, one aspect of the subject matter described in this specification can be embodied in methods that include the actions of obtaining training data comprising a plurality of examples wherein each example comprises one or more features and an answer; training a plurality of different types of predictive models using the training data, wherein each of the predictive models implements a different machine learning technique; obtaining one or more weights wherein each weight is associated with an answer category in the plurality of examples; calculating a weighted accuracy for each of the predictive models using the one or more weights; and selecting one of the predictive models as a most accurate model based at least partly on the calculated weighted accuracies. Other embodiments of this aspect include corresponding systems, apparatus, and computer programs.

These and other aspects can optionally include one or more of the following features. A plurality of the weighted accuracies are calculated in parallel. A particular answer category is a label, a numeric value, a range of numeric values, or a set of numeric values. Calculating the weighted accuracy for a particular predictive model comprises: performing a plurality of rounds of cross-validation of the predictive model using the training data wherein each round of cross-validation produces a plurality of predictions for corresponding examples in the training data; and for one or more of the plurality of predictions each being for a corresponding example, applying the weight associated with the example's answer category to the weighted accuracy for the predictive model. The prediction is correct or incorrect. Each weight further associated with a prediction, and wherein calculating the weighted accuracy for a particular predictive model comprises: performing a plurality of rounds of cross-validation of the predictive model using the training data wherein each round of cross-validation produces a plurality of predictions for corresponding examples in the training data; and for one or more of the plurality of predictions each being for a corresponding example, applying the weight associated with the prediction and the example's answer category to the weighted accuracy for the predictive model. Obtaining the training data further comprises determining the weights based at least partly on the training data. The weights are determined based on a distribution of answer categories in the training data. A particular predictive model is a Naive Bayes classifier, a k-nearest neighbor classifier, a support vector machine, or a predictive model that uses a logistic regression technique.

Particular embodiments of the subject matter described in this specification can be implemented so as to realize one or more of the following advantages. Users can specify one or more utilities (or "weights") that identify the relative utilities of one or more categories in a data set, or each range of values for real-valued data sets. (Weights can also be determined automatically.) For example, if a user specifies a single weight for a category the weight can represent the value of reducing false positives or false negatives for that category. If two weights are specified for a category, the weights can represent the value of reducing both false positives and false negatives for the category. Users only need to specify those categories/values whose weights differ from a default value. The weights can be stored with a model and reused when the model is retrained or updated with new data. The weights can also be used to tune the model when the model makes a training error, where those errors with higher weight change the model more significantly during training. The weights can also be used to calculate a weighted accuracy of predictive models or determine a maximum expected utility for model predictions.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

In various implementations, a predictive model is either a categorical model if its predictions are categories, or is a regression model if its predictions are numeric. A predictive model is trained using training data. Training data encompasses examples that each comprise one or more data fields (or "features") plus an answer (a category or a numeric value) for that example. By way of illustration, the training data in TABLE 1 consists of examples that are email message subject lines and a category that indicates whether each example represents SPAM or not.

TABLE 1

| EMAIL SUBJECT LINE | ANSWER |
|---|---|
| "You have won $$$" | "spam" |
| "Lose weight fast!" | "spam" |
| "Lowest interest rates ever!" | "spam" |
| "How are you?" | "not spam" |
| "Trip to New York" | "not spam" |

After a model has been trained against training data, queries can be submitted to the model. In some implementations, queries are similar in form to training examples: that is, a query has the same or fewer data fields but does not include the answer. The trained model uses patterns that it learned from the training data to either find the closest category for the submitted query (if it is a categorical model) or estimate a value for the query (if it is a regression model), and outputs the category or value. In some implementations, a categorical model is a probabilistic model and outputs a set of results, with one result for each category in the training data, along with a score assigned to that category. Score values range from 0.0-1.0, for example, with 1.0 being the highest. In some implementations, the largest, most positive score is the most likely category predicted for the given input. For example, if the training data categories are A, B and C, an example output from a categorical model would be a set of results such as {A=0.4, B=0.5, C=0.1}, where the score of category A is 0.5, the score of category B is 0.5, and the score of category C is 0.1. Naive Bayes models, maximum entropy models, and support vector machines, for instance, can be used as probabilistic models. Non-probabilistic models can be made to be probabilistic using well-known techniques.

Classifier Evaluation

Figure 1:
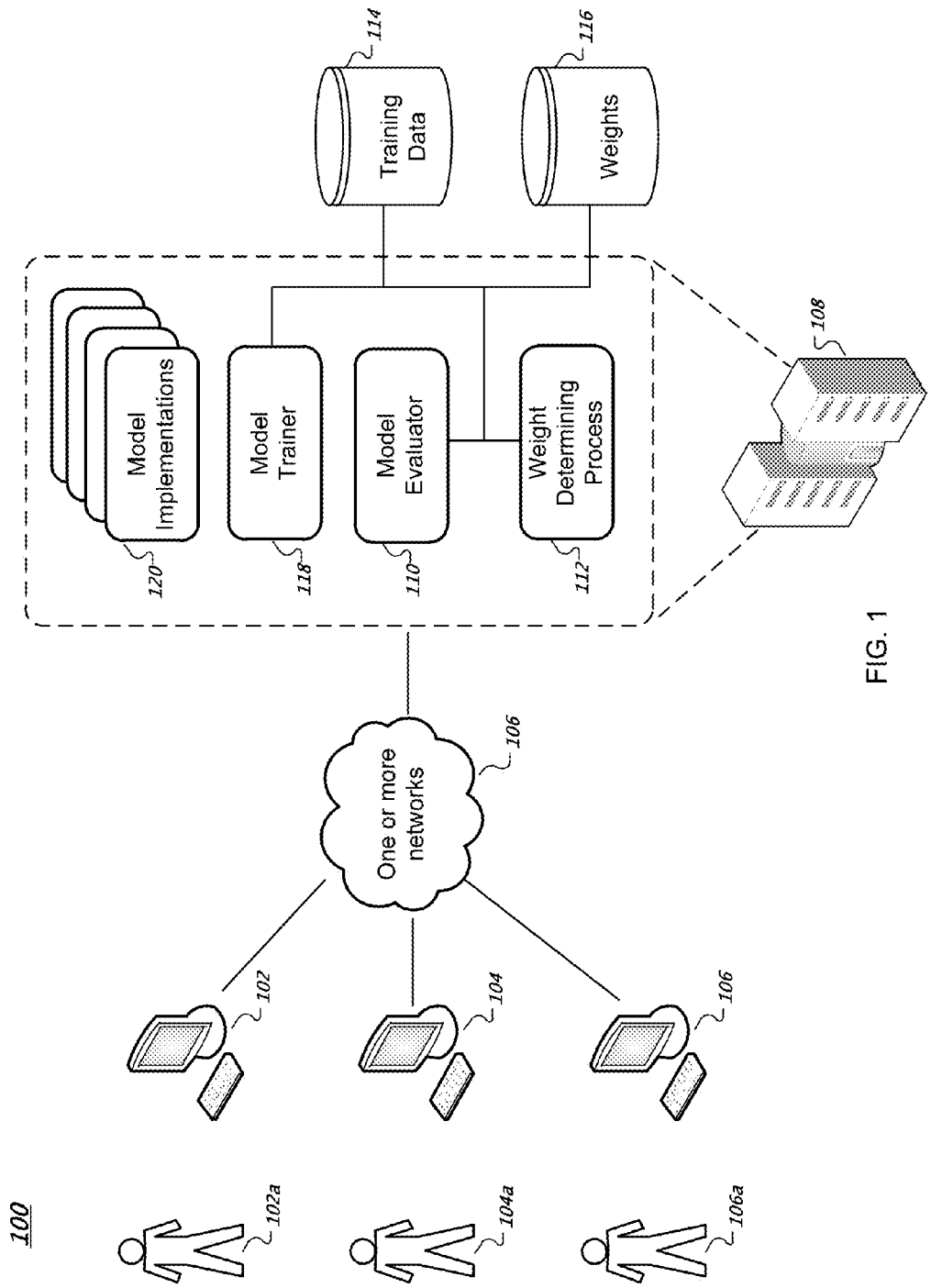
FIG. 1 illustrates an example predictive model system.

FIG. 1 illustrates an example predictive modeling system 100. The system 100 includes one or more client computing devices (clients 102, 104 and 106) that can communicate through one or more networks 106 (e.g., the Internet) with a collection of remote server computing devices (or "servers"), such as servers deployed in a data center 108 or in different geographic locations. Users 102a, 104a, and 106a can interact with the system 100 using web browsers or other computer software that executes on the clients.

A given server comprises one or more data processing apparatus. The servers can communicate with each other and with storage systems (e.g., model training data storage system 114 and weight storage system 116) at various times using one or more computer networks or other communication means. For example, the servers in the data center 108 can be coupled to an intranet. A computer program can execute on a single server or, alternatively, the program can be organized into components that execute on multiple servers. There can be more than one instance or copy of a given computer program executing on the collection of servers at any given time. Multiple copies of a computer program that implements a model implementation, for instance, can be executing at the same time on one or more servers.

Computer programs can be executed in parallel by the servers. For example, two computer programs are executed in parallel if they are executed on different servers and if at least a portion of their execution occurs at the same time. By way of illustration, assume that computer program A is executed on server S1 and computer program B is executed on server S2. If some period of time exists where program A and B are both being executed, then the programs are executed in parallel.

The servers execute computer programs that implement predictive models 120, a model trainer 118, a model evaluator 110, and an optional weight determining process 112. (The weight determining process 112 is discussed further below.) A model implementation is one or more computer programs that execute on one or more servers. For example, the model implementation can be a computer program that is designed to execute on a single server or it can be designed to execute on multiple servers. An example of the later approach is a model implemented as a map-reduce system. A map-reduce system includes application-independent map modules configured to read input data and to apply at least one application-specific map operation to the input data to produce intermediate data values. The map operation is automatically parallelized across multiple servers. Intermediate data structures are used to store the intermediate data values. Application-independent reduce modules are configured to retrieve the intermediate data values and to apply at least one application-specific reduce operation to the intermediate data values to provide output data. The map-reduce system is described further in U.S. Pat. No. 7,650,331, entitled "System and method for efficient large-scale data processing," which is incorporated by reference herein in its entirety.

A given model (e.g., a support vector machine) can have a number of different possible model implementations. For example, there can be small, medium and large implementations. By way of illustration, a small implementation can use the computing resources of a single server, a medium implementation can have a parallelized implementation (e.g., a map-reduce implementation) that uses the resources of N servers, and a large implementation can have a parallelized implementation that uses the resources of P servers, where P>N.

The weight storage system 116 stores one or more weights to be used to determine a weighted accuracy for a set of models that have been trained with the same training data. In further implementations, the weights can be used to tune the models as they are being trained. (Model tuning is described further below.) The model trainer 118 can train different types of predictive models using the training data stored in the training data system 114. Each of the trained predictive models implements a different machine learning technique (e.g., Naive Bayes classifier, a k-nearest neighbor classifier, a support vector machine, or a predictive model that uses a logistic regression technique). The model evaluator 110 calculates a weighted accuracy for each of the predictive models using the weights.

In some implementations, the model evaluator 110 performs one or more rounds of cross-validation of each predictive model using the training data wherein each round of cross-validation produces a plurality of predictions for corresponding examples in the training data. Validation can be performed using K-fold validation, k×2 cross-validation, or random sub-sampling validation, for example. Other validation techniques are possible. Depending on the specified weights, some predictions count more towards the accuracy of a given model than others. (Calculation of weighted accuracy is discussed further below.) The model evaluator 110 selects one or more of the predictive models as the most accurate models based on the calculated weighted accuracies. In some implementations, the predictive models having the highest weighted accuracy scores are selected. The weighted accuracies of different models can be calculated in parallel.

The weights can be specified by a user (e.g., user 104*a*) or can be determined automatically by the weight determining process 112. A given weight is associated with an answer category. If the model is a categorical model, an answer category is a label that corresponds to a type of answer in the training data (e.g., "spam", "not spam"). If the model is a regression model, the answer category is a set of one or more values (or a range of values) that correspond to answers in the training data (e.g., 0.8 through 0.9, 2.4, 3.34). In various implementations, a weight can be specified as a tuple: <A, P, W>, where A is the category of an example's answer, P is a model's prediction for the example, and W is a weight to apply.

Weights can be viewed as being for false positive predictions or false negative predictions. In the email example above, the weights can be specified so that a false negative prediction is worth 10,000 times more than a false positive prediction:

<"spam", "not spam", 10000>

<"not spam", "spam", 1>.

Weights can be specified for a variety of input/prediction combinations. This can be visualized as a matrix with predictions forming the vertical axis, answer categories of input examples forming the horizontal axis, and the diagonal of the matrix representing correct predictions. For example, if there are three answer categories A, B and C, the matrix could be as follows:

TABLE 2

|   | A | B | C |
|---|---|---|---|
| A | 100 | 1 | 50 |
| B | 1 | 100 | 50 |
| C | 1 | 1 | 100 |

The nine weights for the above matrix would be:

<A, A, 100>

<A, B, 1>

<A, C, 50>

<B, A, 1>

<B, B, 100>

<B, C, 50>

<C, A, 1>

<C, B, 1>

<C, C, 100>.

In this example, correct predictions in any answer category are weighted as 100 whereas incorrect predictions are weighted as 1 or 50 depending on the combination of prediction and example answer category.

In various implementations, the weighted accuracy WA can be computed $$WA(M) = \frac{\sum_{i=0}^{n} IsCorrect(Mp(x_i)) \times w(answer(x_i), Mp(x_i))}{\sum_{i=0}^{n} 1 + (IsCorrect(Mp(x_i)) \times w(answer(x_i), Mp(x_i)))} \quad (1)$$

where M is the model, n is the number of training examples being validated, $x_i$ is an instance of a training example in the training data for M, $Mp(x_i)$ is a prediction by M for the training example $x_i$, $IsCorrect(Mp(x_i))$ is equal to 1 if the prediction is correct (i.e., if the prediction matches $x_i$'s correct answer) and 0 if the prediction is incorrect, $answer(x_i)$ is equal to $x_i$'s answer, and w(a, b) is equal to the weight w for a tuple specified by <a, b, w> or 0 if there is not a matching tuple. For example, a given a weight of <"not spam", "not spam", 10000>, the numerator and denominator of the WA are both increased by 10,000 each time a model M correctly predicts that an email message is "not spam".

Figure 2:
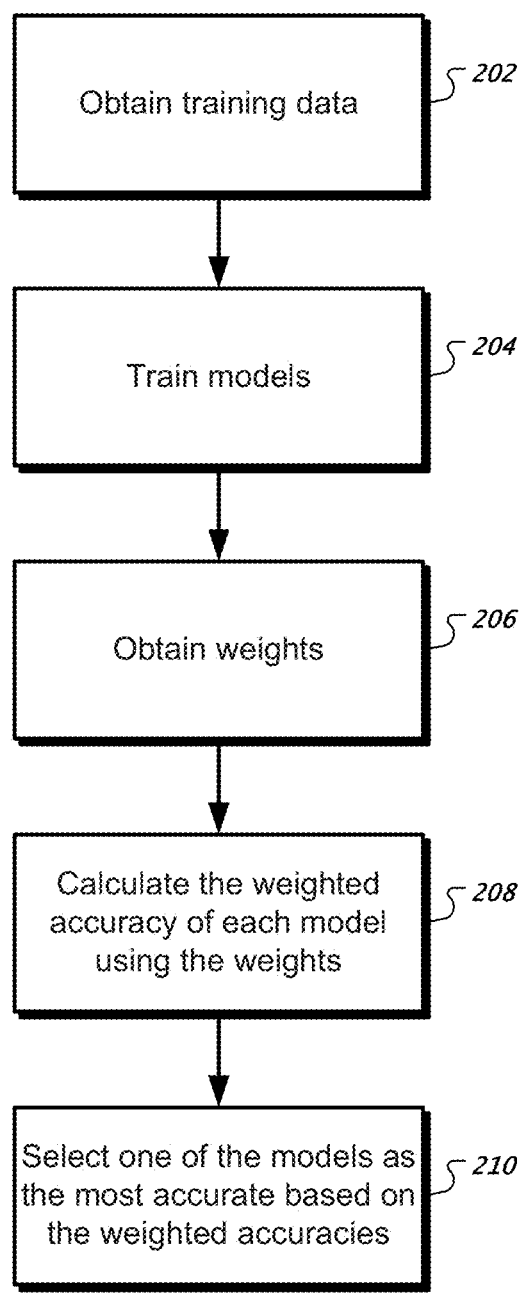
FIG. 2 is a flowchart of an example process for determining the weighted accuracy of a set of predictive models.

FIG. 2 is a flowchart of an example process 200 for determining the weighted accuracy of a set of predictive models. Training data is obtained from, for example, the training data storage system 114 (step 202). The training data comprises a plurality of examples. Each example includes one or more features and an answer. Different types of predictive models are trained using the obtained training data (step 204). The training can be performed by multiple instances of the model trainer 118, for example. One or more weights are obtained (e.g., from the weight storage system 116; step 206). The weights are used to calculate a weighted accuracy WA for each model (step 208). Calculating the weighted accuracy can be performed by the model evaluator 110. The model having the most accurate weighted accuracy WA is selected (step 210) as the best model to use for the given training data. If there is a tie between two or more models, then a model can be selected based on other factors besides weighted accuracy such as, for example, the size of the models or the execution speeds of the models.

An application programming interface (API) can be utilized by software executing on clients 102, 104 and 106 to programmatically specify weights for a given training data. In some implementations, the API is implemented in the Hypertext Transfer Protocol (HTTP). Other APIs are possible. Using the API, weights can be specified using the HTTP POST method. The following message specifies a single weight for answer category "category X":

POST https://www.googleapis.com/prediction/training?key=api_key

{

"id": "training_bucket/training_data",

"weights": {"category X": 10}

. . .

}

The following message specifies two weights for answer category "category X", the first weight being for a correct prediction and the second weight being for an incorrect prediction:

POST
https://www.googleapis.com/prediction/
training?key=api_key
{
"id": "training_bucket/training_data",
"weights": {"category X": 10, 5}
...
}

Another message type can be used to calculated the weighted accuracy of a model based on weights specified in the message:
POST
{
"kind": "prediction#training",
"id": "training_bucket/training_data",
"selfLink": "https://www.apis.com/prediction/URL_of_resource,
"modelInfo": {
   "modelType": "categoryification",
   "categoryificationAccuracy": 0.XX,
   "weights": {"category X": 10, "category Y": 4, ... },
"trainingStatus":status
}

Other API messages are possible.

The weight determining process 112 can determine weights automatically from training data. For example, weights can be derived based on the distribution of answer categories in the training set. By way of illustration, if a training dataset has 5 examples of category A, 10 examples of category B, and 1 example of category C, the weight determining process 112 can specify even performance on all categories by creating tuples that weight correction predictions of C as 10, B as 1 and A as 2. Another approach is to take the logarithm of the number of category examples where the weight of category A would be log(5), B would be log(10)=1, and C would be log(1)=0. Other ways of automatically determining weights are possible.

In some implementations, the weight determining process 112 can determine weights with guidance from user-specified heuristics. Such heuristics can direct the weight determining process 112 to value small answer categories over large ones, specify the value of answer categories (e.g., high, medium, and low), value categories that have an instance count below a certain threshold, and so on.

Maximum Expected Utility Classification

Making a statistically optimal decision does not require that a model know about the costs, simply that it produce good probabilities. Consequently, any probabilistic model can be used to maximize utility; those that produce better probabilities should produce better results. A typical decision function for classifiers is to choose the category with maximum probability. In various implementations, however, the category that maximizes expected utility is determined by the following:

$$\delta(x)=\max_d \Sigma_y p(y|x) U(y,d) \quad (2)$$

where x is a training example instance, p is the probability of category y given x, d are the possible decision labels, y are the possible categories, and U is the utility function.

For example, if an instance x is a type of mushroom and the possible categories y are "poisonous" and "nonpoisonous", the utility function U is a decision whether to "eat" or "do not eat" the mushroom of instance x. Whether or not the mushroom is poisonous becomes irrelevant if one is on the brink of starvation. That is, if one was starving (e.g., d="eat") one would choose to eat the mushroom even if the probability of the mushroom being poisonous was greater than zero. In such a case, the utility function U would cause the nonpoisonous category to have a higher probability than the poisonous category. This means that category results are re-ranked during prediction rather than training so that categories/output regions for regression that are more favored in terms of utility receive "extra points" and are weighted differently at prediction time.

In various implementations, the utility function U can providing a mapping between a prediction p(y|x) and a decision label d. Each mapping can be specified as a tuple: <y, d, m> where y specifies a prediction category, d specifies a decision label, and m specifies a mapping for p(y|x). For example, m could specify that p(y|x) is multiplied by two.

For example, assuming that:

$$p(y|x)=\{A:0.5, B:0.3, C:0.2\},$$

where category A has a probability of 0.5, category B has a probability of 0.3, category C has a probability of 0.2, and the utility function U weights category C twice that of category B or category A, then:

$$p(y|x)U(y,d) = \left\{ A: 0.42 \text{ or } \frac{5}{12}, B: 0.25 \text{ or } \frac{3}{12}, C: 0.33 \text{ or } \frac{2}{12} \right\},$$

where 12 is the sum of the probabilities of A, B and 2×C. Therefore, δ(x)=A.

Figure 3:
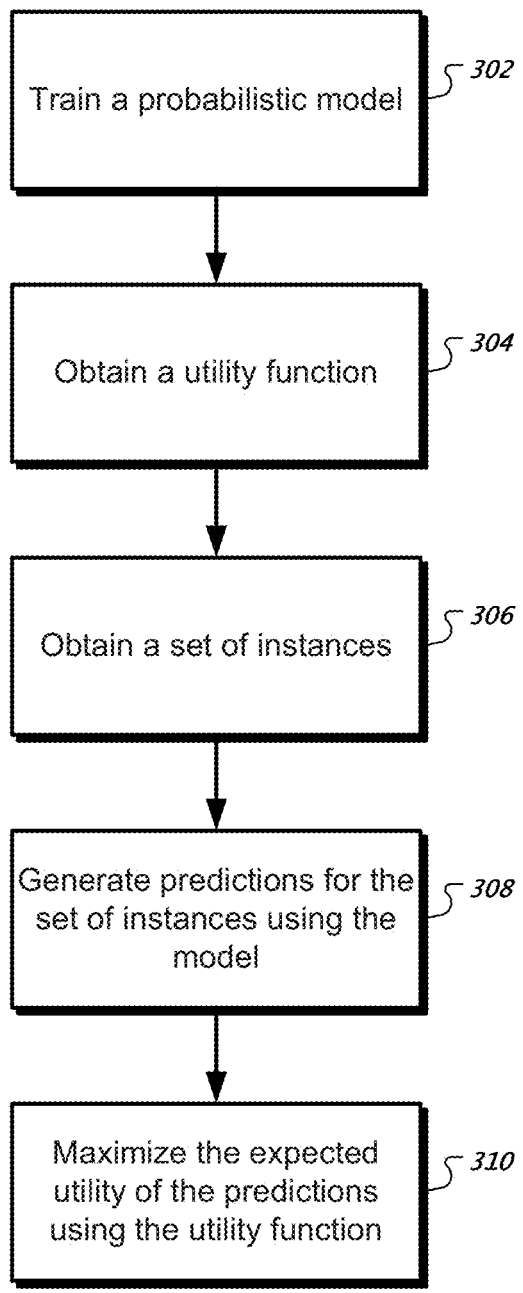
FIG. 3 is a flowchart of an example process 300 for applying a maximizing expected utility to the output of a probabilistic model.

FIG. 3 is a flowchart of an example process 300 for applying a maximizing expected utility to the output of a probabilistic model. A probabilistic model M is first trained (step 302). The training can be performed by the model trainer 118 using training data in the training data storage system 114, for example. A utility function U is then obtained (step 304). The utility function can be specified as mapping tuples, as described above. A set of training example instances is obtained (step 306) and a prediction is generated for each using the model M (step 308). The predictions can be generated using the model evaluator 110 or another computer program, for instance. One or more of the generated predictions are then modified by applying formula (2) above to determine the maximum expected utility for the predictions (step 310).

Error Correction

In further implementations, user-specified or automatically determined training weights can be provided to machine learning algorithms that are configured to use them during training. For example, a model that is trained using the winnow algorithm (or another algorithm such as, for instance, Naive Bayes) can use the provided training weights to alter its own prediction coefficients to learn a classifier for the model.

When a classifier makes a prediction error, the learning algorithm can use the provided weights to adjust its prediction rule and thereby correct for the error. By way of illustration, if it is important that the classifier predict category A correctly, the learning algorithm can be altered when the classifier incorrectly predicts category A so that it changes more significantly than when the classifier incorrectly predicts other categories. Non-probabilistic models that do not support cost-sensitive learning can be converted to probabilistic classifiers by fitting a sigmoid function to their output and using them as described above. A sigmoid function can be used to model the output of each possible category. The shape of the sigmoid curve can incorporate the weights of each category, biasing towards those that are more valuable and away from those that are less so. The sum of all the sigmoid functions for each example should be equal to 1. Then, the calculated value of each sigmoid function is considered as the probability of the corresponding class.

By way of example, the winnow machine learning algorithm uses the following rule for prediction:

$$p = \sum_{i=1}^{n} w_i f_i \quad (3)$$

where $w_i$ is a coefficient for $i \in \{1 \ldots n\}$ and the training examples each comprises the features $f_1, \ldots f_n$. If $p > \Theta$ then the prediction is equal to 1, otherwise the prediction is equal to 0. The threshold $\Theta$ is a real number (e.g., $$\left(\text{e.g., } \Theta = \frac{n}{2}\right).$$

The update rule an winnow is generally as follows. If an example is correctly classified, do nothing. If an example is predicted to be 1 but the correct result was 0, all of the coefficients involved in the mistake are set to zero. If an example is predicted to be 0 but the correct result was 1, all of the coefficients involved in the mistake are multiplied by $\alpha$ (e.g., $\alpha=2$). In various implementations, $\alpha$ can be set to, or adjusted by, a training weight provided by a weight tuple: <A, P, W>, where A is the category of an example's correct answer, P is the model's prediction for the example, and W is a weight to apply to $\alpha$. A weight W can be used to linearly shift the coefficients, for example. Other ways of specifying weights are possible.

Figure 4:
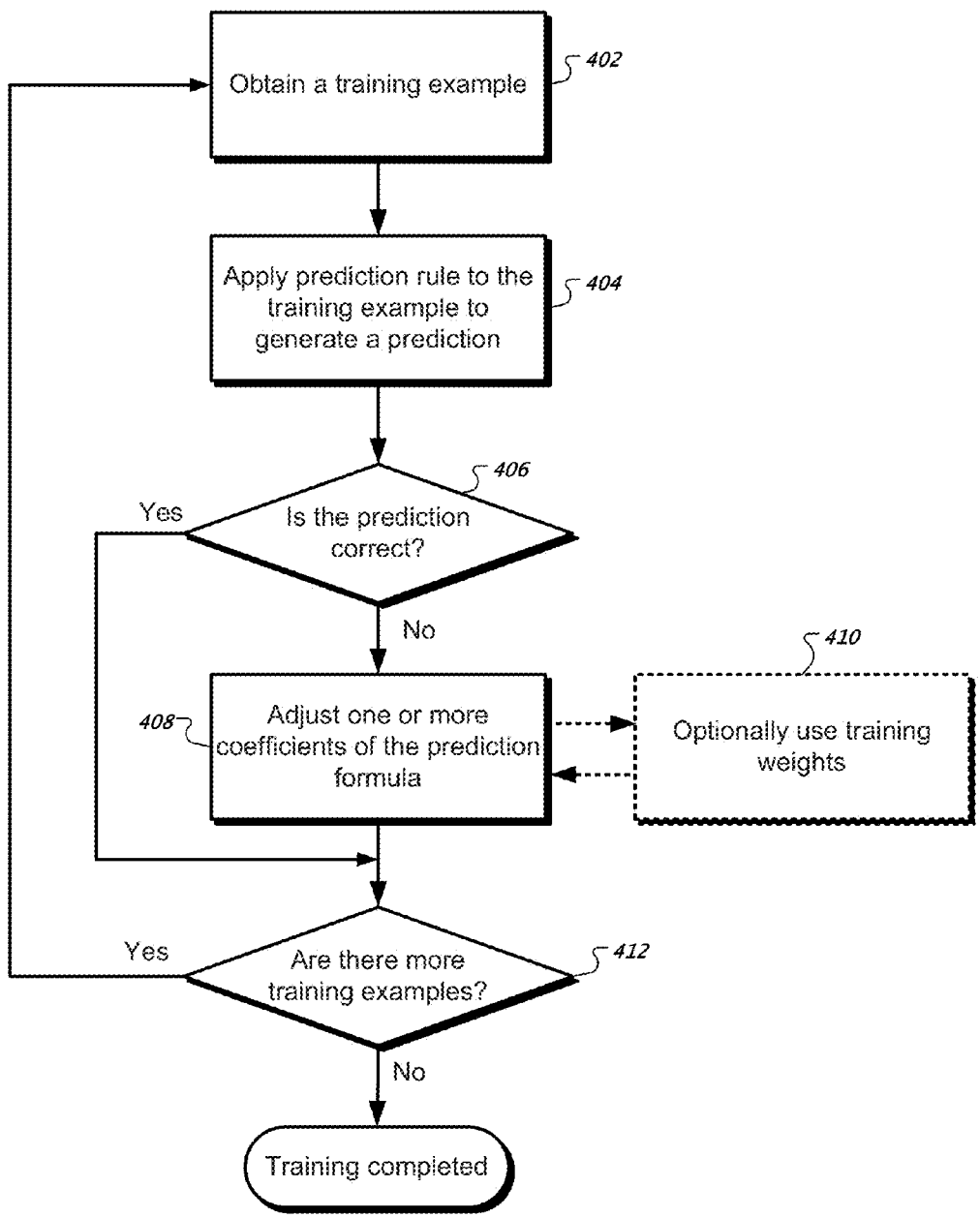
FIG. 4 is a flowchart of an example process for using weights during model training.

FIG. 4 is a flowchart of an example process 400 for using weights during model training A training example is obtained, such as an example that has the features $f_1, \ldots f_n$ (step 402). A machine learning algorithm's prediction rule is then applied to the training example to generate a prediction (step 404). If the prediction is correct (step 406), it is determined whether there are more training examples (step 412). If so, the process continues at step 402 where another training example is obtained. If there are no further training examples (step 412), the training is completed.

If the prediction is incorrect (step 406), one or more coefficients of the prediction rule are modified (step 408) by $\alpha$. The value of the coefficients can be equal to, or adjusted by, one or more provided training weights (step 410). The process continues at step (412) where, if there are more training examples, the process continues at step 402 where another training example is obtained. Otherwise, the process terminates.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, the method comprising:
   obtaining training data comprising a plurality of examples wherein each example comprises one or more features and an answer;
   training a plurality of different types of predictive models using the training data, wherein each of the predictive models implements a different machine learning technique;
   obtaining weights wherein each weight is associated with a respective answer category in the plurality of examples, each of the weights indicating an amount the respective answer category will count toward a weighted accuracy for each of the predictive models;
   calculating the weighted accuracy for each of the predictive models using the respective weights; and
   selecting one of the predictive models as the most accurate model based at least partly on the calculated weighted accuracies.

2. The method of claim 1 wherein a plurality of the weighted accuracies are calculated in parallel.

3. The method of claim 1 wherein a particular answer category is a label, a numeric value, a range of numeric values, or a set of numeric values.

4. The method of claim 1 wherein calculating the weighted accuracy for a particular predictive model comprises:
performing a plurality of rounds of cross-validation of the predictive model using the training data wherein each round of cross-validation produces a plurality of predictions for corresponding examples in the training data; and
for one or more of the plurality of predictions each being for a corresponding example, applying the weight associated with the example's answer category to the weighted accuracy for the predictive model.

5. The method of claim 4 wherein the prediction is correct.

6. The method of claim 4 wherein the prediction is incorrect.

7. The method of claim 1 wherein each weight further associated with a prediction, and wherein calculating the weighted accuracy for a particular predictive model comprises:
performing a plurality of rounds of cross-validation of the predictive model using the training data wherein each round of cross-validation produces a plurality of predictions for corresponding examples in the training data; and
for one or more of the plurality of predictions each being for a corresponding example, applying the weight associated with the prediction and the example's answer category to the weighted accuracy for the predictive model.

8. The method of claim 1 wherein obtaining the training data further comprises determining the weights based at least partly on the training data.

9. The method of claim 8 wherein the weights are determined based on a distribution of answer categories in the training data.

10. The method of claim 1 wherein a particular predictive model is a Naive Bayes classifier, a k-nearest neighbor classifier, a support vector machine, or a predictive model that uses a logistic regression technique.

11. A system comprising:
data processing apparatus configured to execute instructions which cause the data processing apparatus to perform operations comprising:
obtaining training data comprising a plurality of examples wherein each example comprises one or more features and an answer;
training a plurality of different types of predictive models using the training data, wherein each of the predictive models implements a different machine learning technique;
obtaining weights wherein each weight is associated with a respective answer category in the plurality of examples, each of the weights indicating an amount the respective answer category will count toward a weighted accuracy for each of the predictive models;
calculating the weighted accuracy for each of the predictive models using the respective weights; and
selecting one of the predictive models as the most accurate model based at least partly on the calculated weighted accuracies.

12. The system of claim 11 wherein a plurality of the weighted accuracies are calculated in parallel.

13. The system of claim 11 wherein a particular answer category is a label, a numeric value, a range of numeric values, or a set of numeric values.

14. The system of claim 11 wherein calculating the weighted accuracy for a particular predictive model comprises:
performing a plurality of rounds of cross-validation of the predictive model using the training data wherein each round of cross-validation produces a plurality of predictions for corresponding examples in the training data; and
for one or more of the plurality of predictions each being for a corresponding example, applying the weight associated with the example's answer category to the weighted accuracy for the predictive model.

15. The system of claim 14 wherein the prediction is correct.

16. The system of claim 14 wherein the prediction is incorrect.

17. The system of claim 11 wherein each weight further associated with a prediction, and wherein calculating the weighted accuracy for a particular predictive model comprises:
performing a plurality of rounds of cross-validation of the predictive model using the training data wherein each round of cross-validation produces a plurality of predictions for corresponding examples in the training data; and
for one or more of the plurality of predictions each being for a corresponding example, applying the weight associated with the prediction and the example's answer category to the weighted accuracy for the predictive model.

18. The system of claim 11 wherein obtaining the training data further comprises determining the weights based at least partly on the training data.

19. The system of claim 18 wherein the weights are determined based on a distribution of answer categories in the training data.

20. The system of claim 11 wherein a particular predictive model is a Naive Bayes classifier, a k-nearest neighbor classifier, a support vector machine, or a predictive model that uses a logistic regression technique.

21. A storage medium having instructions stored thereon that, when executed by data processing apparatus, cause the data processing apparatus to perform operations comprising:
obtaining training data comprising a plurality of examples wherein each example comprises one or more features and an answer;
training a plurality of different types of predictive models using the training data, wherein each of the predictive models implements a different machine learning technique;
obtaining weights wherein each weight is associated with a respective answer category in the plurality of examples, each of the weights indicating an amount the respective answer category will count toward a weighted accuracy for each of the predictive models;
calculating the weighted accuracy for each of the predictive models using the respective weights; and
selecting one of the predictive models as the most accurate model based at least partly on the calculated weighted accuracies.

22. The storage medium of claim 21 wherein a plurality of the weighted accuracies are calculated in parallel.

23. The storage medium of claim 21 wherein a particular answer category is a label, a numeric value, a range of numeric values, or a set of numeric values.

24. The storage medium of claim 21 wherein calculating the weighted accuracy for a particular predictive model comprises:
performing a plurality of rounds of cross-validation of the predictive model using the training data wherein each round of cross-validation produces a plurality of predictions for corresponding examples in the training data; and for one or more of the plurality of predictions each being for a corresponding example, applying the weight associated with the example's answer category to the weighted accuracy for the predictive model.

25. The storage medium of claim 24 wherein the prediction is correct.

26. The storage medium of claim 24 wherein the prediction is incorrect.

27. The storage medium of claim 21 wherein each weight further associated with a prediction, and wherein calculating the weighted accuracy for a particular predictive model comprises:

performing a plurality of rounds of cross-validation of the predictive model using the training data wherein each round of cross-validation produces a plurality of predictions for corresponding examples in the training data; and for one or more of the plurality of predictions each being for a corresponding example, applying the weight associated with the prediction and the example's answer category to the weighted accuracy for the predictive model.

28. The storage medium of claim 21 wherein obtaining the training data further comprises determining the weights based at least partly on the training data.

29. The storage medium of claim 28 wherein the weights are determined based on a distribution of answer categories in the training data.

30. The storage medium of claim 21 wherein a particular predictive model is a Naive Bayes classifier, a k-nearest neighbor classifier, a support vector machine, or a predictive model that uses a logistic regression technique.

* * * * *